(12) United States Patent
Kim et al.

(10) Patent No.: US 9,353,263 B2
(45) Date of Patent: May 31, 2016

(54) FINE PITCH ELECTRICAL CONNECTOR AND A THERMOPLASTIC COMPOSITION FOR USE THEREIN

(71) Applicant: Ticona LLC, Florence, KY (US)

(72) Inventors: Young Shin Kim, Erlanger, KY (US); Xinyu Zhao, Cincinnati, OH (US); Joseph J. Grenci, Florence, KY (US)

(73) Assignee: Ticona LLC, Florence, KY (US)

( * ) Notice: Subject to any disclaimer, the term of this patent is extended or adjusted under 35 U.S.C. 154(b) by 45 days.

(21) Appl. No.: 13/675,104

(22) Filed: Nov. 13, 2012

(65) Prior Publication Data
US 2013/0122758 A1 May 16, 2013

Related U.S. Application Data

(60) Provisional application No. 61/559,839, filed on Nov. 15, 2011, provisional application No. 61/641,390, filed on May 2, 2012.

(51) Int. Cl.
*H01R 13/40* (2006.01)
*C08L 77/12* (2006.01)
(Continued)

(52) U.S. Cl.
CPC . *C08L 77/12* (2013.01); *C08K 7/14* (2013.01); *C08K 13/04* (2013.01); *H01B 3/423* (2013.01); *H01R 12/75* (2013.01); *H01R 43/18* (2013.01); *Y10T 428/1397* (2015.01)

(58) Field of Classification Search
CPC .......... C08L 77/12; C08K 7/14; C08K 13/04; H01R 43/18; H01B 3/423; Y10T 428/1397
USPC .............. 439/733.1, 342, 325, 327–328, 638, 439/660
See application file for complete search history.

(56) References Cited

U.S. PATENT DOCUMENTS

| 4,083,829 A | 4/1978 | Calundann et al. |
| 4,161,470 A | 7/1979 | Calundann |

(Continued)

FOREIGN PATENT DOCUMENTS

| EP | 0 565 353 A1 | 10/1993 |
| EP | 0 856 558 A1 | 8/1998 |

(Continued)

OTHER PUBLICATIONS

Abstract of Chinese Patent—CN101200641, Jun. 18, 2008, 1 page.
(Continued)

*Primary Examiner* — Jean F Duverne
(74) *Attorney, Agent, or Firm* — Dority & Manning, P.A.

(57) ABSTRACT

A thermoplastic composition for use in a fine pitch electrical connector is provided. The thermoplastic composition contains a liquid crystalline polymer and a plurality of fibers. The volume average length of the fibers in the thermoplastic composition is selectively controlled according to the present invention so that it is within a certain range, such as from about 80 to about 250 micrometers. The fibers also have a narrow length distribution. That is, at least about 70% by volume of the fibers have a length within a certain range. Through the use of a liquid crystalline polymer and fibers of a certain weight average length and narrow length distribution, the present inventors have discovered that the resulting thermoplastic composition is able to achieve a desirable combination of strength and flowability, which enables it to be uniquely suited for the walls of a fine pitch connector.

26 Claims, 9 Drawing Sheets

(51) Int. Cl.
*C08K 13/04* (2006.01)
*H01B 3/42* (2006.01)
*C08K 7/14* (2006.01)
*H01R 12/75* (2011.01)
*H01R 43/18* (2006.01)

(56) References Cited

U.S. PATENT DOCUMENTS

| | | |
|---|---|---|
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,522,974 A | 6/1985 | Calundann et al. |
| 4,892,926 A | 1/1990 | Suenaga et al. |
| 5,075,418 A | 12/1991 | Suenaga et al. |
| 5,204,443 A | 4/1993 | Lee et al. |
| 5,204,473 A | 4/1993 | Winter et al. |
| 5,298,593 A | 3/1994 | Fujiwara et al. |
| 5,306,806 A | 4/1994 | Tanabe et al. |
| 5,326,848 A | 7/1994 | Kashimura et al. |
| 5,352,746 A | 10/1994 | Asai et al. |
| 5,376,730 A | 12/1994 | Niwano et al. |
| 5,446,124 A | 8/1995 | Niwano et al. |
| 5,508,374 A | 4/1996 | Lee et al. |
| 5,541,240 A | 7/1996 | Makhija et al. |
| 5,616,680 A | 4/1997 | Linstid, III |
| 5,663,276 A | 9/1997 | Yoneta et al. |
| 5,679,456 A | 10/1997 | Sakai et al. |
| 5,710,237 A | 1/1998 | Waggoner et al. |
| 5,766,507 A | 6/1998 | Nakai |
| 5,891,532 A | 4/1999 | Furuta et al. |
| 5,904,581 A | 5/1999 | Pope et al. |
| 5,969,083 A | 10/1999 | Long et al. |
| 5,971,818 A | 10/1999 | Juntwait et al. |
| 5,976,406 A | 11/1999 | Nagano et al. |
| 5,980,308 A | 11/1999 | Hu et al. |
| 5,989,758 A | 11/1999 | Komatsu et al. |
| 5,997,765 A | 12/1999 | Furuta et al. |
| 6,010,760 A | 1/2000 | Miyazaki et al. |
| 6,046,300 A | 4/2000 | Umetsu et al. |
| 6,063,848 A | 5/2000 | Murakami et al. |
| 6,114,492 A | 9/2000 | Linstid, III et al. |
| 6,140,455 A | 10/2000 | Nagashima et al. |
| 6,294,618 B1 | 9/2001 | Soelch |
| 6,296,930 B1 | 10/2001 | Ohbe et al. |
| 6,306,946 B1 | 10/2001 | Long et al. |
| 6,376,076 B1 | 4/2002 | Ohbe et al. |
| 6,492,463 B1 | 12/2002 | Waggoner |
| 6,514,611 B1 | 2/2003 | Shepherd et al. |
| 6,528,164 B1 | 3/2003 | Ohbe et al. |
| 6,582,625 B2 | 6/2003 | Nagashima et al. |
| 6,613,847 B2 | 9/2003 | Soelch |
| 6,649,730 B2 | 11/2003 | Okamoto et al. |
| 6,656,386 B2 | 12/2003 | Suenaga et al. |
| 6,656,578 B2 | 12/2003 | Ohbe et al. |
| 6,680,002 B2 | 1/2004 | Yamauchi et al. |
| 6,702,955 B1 | 3/2004 | Murakami et al. |
| 6,702,956 B2 | 3/2004 | Maeda et al. |
| 6,733,691 B2 | 5/2004 | Nagano et al. |
| 6,755,992 B2 | 6/2004 | Okamoto et al. |
| 6,756,427 B2 | 6/2004 | Maeda |
| 6,758,989 B2 | 7/2004 | Miyashita et al. |
| 6,773,287 B2 | 8/2004 | Takashita |
| 6,793,847 B2 | 9/2004 | Maeda et al. |
| 6,797,198 B1 | 9/2004 | Miyashita et al. |
| 6,824,396 B2 | 11/2004 | Koopman et al. |
| 6,833,405 B1 | 12/2004 | Cottis |
| 6,861,463 B2 | 3/2005 | Cottis |
| 6,966,793 B2 | 11/2005 | Brekosky et al. |
| 6,984,712 B2 | 1/2006 | Ueno et al. |
| 7,014,921 B2 | 3/2006 | Okamoto et al. |
| 7,063,892 B2 | 6/2006 | Okamoto |
| 7,137,832 B2 | 11/2006 | Mongold et al. |
| 7,175,779 B1 | 2/2007 | Kricheldorf et al. |
| 7,231,776 B2 | 6/2007 | Cäsar et al. |
| 7,258,567 B2 | 8/2007 | Tanaka et al. |
| 7,304,121 B2 | 12/2007 | Kato et al. |
| 7,335,318 B2 | 2/2008 | Asahara et al. |
| 7,344,657 B2 | 3/2008 | Okamoto et al. |
| 7,380,527 B2 | 6/2008 | Reisser |
| 7,393,467 B2 | 7/2008 | Asahara et al. |
| 7,405,249 B2 | 7/2008 | Kim |
| 7,405,250 B2 | 7/2008 | Kim |
| 7,517,240 B2 | 4/2009 | Ma |
| 7,540,785 B1 | 6/2009 | Zhao |
| 7,578,950 B2 | 8/2009 | Kirchner et al. |
| 7,618,552 B2 | 11/2009 | Hosoda et al. |
| 7,648,748 B2 | 1/2010 | Nakane et al. |
| 7,789,670 B2 | 9/2010 | Fukatsu et al. |
| 7,799,855 B2 | 9/2010 | Ebeling et al. |
| 7,824,572 B2 | 11/2010 | Okamoto |
| 7,825,176 B2 | 11/2010 | Kim et al. |
| 7,862,745 B2 | 1/2011 | Tano et al. |
| 7,888,450 B2 | 2/2011 | Uehira |
| 7,897,083 B2 | 3/2011 | Fukatsu et al. |
| 7,980,897 B2 | 7/2011 | Fukatsu et al. |
| 8,071,711 B2 | 12/2011 | Hosoda et al. |
| 8,142,683 B2 | 3/2012 | Murouchi et al. |
| 8,192,219 B2 | 6/2012 | Satoh |
| 8,192,645 B2 | 6/2012 | Murouchi et al. |
| 8,202,448 B2 | 6/2012 | Fukuhara et al. |
| 8,231,805 B2 | 7/2012 | Fukuhara et al. |
| 8,231,807 B2 | 7/2012 | Yonezawa et al. |
| 8,272,879 B2 | 9/2012 | Fukatsu et al. |
| 8,337,719 B2 | 12/2012 | Hosoda et al. |
| 8,432,484 B2 | 4/2013 | Christison |
| 8,440,780 B2 | 5/2013 | Hamaguchi et al. |
| 8,834,741 B2 | 9/2014 | Shiraishi et al. |
| 2002/0190432 A1 | 12/2002 | Shiwaku et al. |
| 2003/0001139 A1* | 1/2003 | Nagano et al. ........... 252/299.67 |
| 2004/0092143 A1 | 5/2004 | Fromm et al. |
| 2004/0234595 A1* | 11/2004 | Mohammad ................. 424/465 |
| 2004/0235998 A1 | 11/2004 | Kirchner |
| 2005/0191877 A1 | 9/2005 | Huang |
| 2005/0260372 A1 | 11/2005 | Matsuoka et al. |
| 2006/0025561 A1 | 2/2006 | Watanabe et al. |
| 2006/0073306 A1 | 4/2006 | Nakane et al. |
| 2006/0197862 A1 | 9/2006 | Lung |
| 2007/0049706 A1 | 3/2007 | Siripurapu et al. |
| 2007/0106035 A1 | 5/2007 | Gomurashvili et al. |
| 2007/0293633 A1 | 12/2007 | Hosoda et al. |
| 2008/0002970 A1 | 1/2008 | Cheng et al. |
| 2008/0285968 A1 | 11/2008 | Chang et al. |
| 2009/0027586 A1 | 1/2009 | Kumai et al. |
| 2009/0275697 A1 | 11/2009 | Waggoner et al. |
| 2010/0326699 A1 | 12/2010 | Greyling |
| 2011/0114884 A1* | 5/2011 | Fukuhara et al. .......... 252/299.6 |
| 2011/0189454 A1 | 8/2011 | Fukuhara et al. |
| 2011/0189455 A1 | 8/2011 | Fukuhara et al. |
| 2011/0210290 A1 | 9/2011 | Harada et al. |
| 2011/0233462 A1 | 9/2011 | Bu et al. |
| 2012/0022202 A1 | 1/2012 | Suh et al. |
| 2012/0119142 A1 | 5/2012 | Osato et al. |
| 2012/0135228 A1 | 5/2012 | Fukuhara et al. |
| 2012/0153224 A1 | 6/2012 | Yonezawa et al. |
| 2012/0190813 A1 | 7/2012 | Taguchi |
| 2012/0199790 A1 | 8/2012 | Yun et al. |
| 2012/0235089 A1 | 9/2012 | Nakayama et al. |
| 2013/0015400 A1 | 1/2013 | Matsubara et al. |
| 2013/0015401 A1 | 1/2013 | Matsubara et al. |

(56) References Cited

U.S. PATENT DOCUMENTS

| | | |
|---|---|---|
| 2013/0022828 A1 | 1/2013 | Matsubara et al. |
| 2013/0026413 A1 | 1/2013 | Uchida et al. |
| 2013/0119317 A1 | 5/2013 | Kim et al. |
| 2013/0121682 A1 | 5/2013 | Kim et al. |
| 2013/0122272 A1 | 5/2013 | Kim |
| 2013/0122273 A1 | 5/2013 | Kim |
| 2013/0122274 A1 | 5/2013 | Kim et al. |
| 2013/0123420 A1 | 5/2013 | Kim |
| 2013/0231434 A1 | 9/2013 | Lee et al. |

FOREIGN PATENT DOCUMENTS

| | | |
|---|---|---|
| EP | 0 919 363 A1 | 6/1999 |
| EP | 1 621 319 A1 | 2/2006 |
| EP | 1 792 942 A1 | 6/2007 |
| WO | WO 95/33803 A1 | 12/1995 |
| WO | WO 02/02717 A2 | 1/2002 |
| WO | WO 2004/058851 A1 | 7/2004 |

OTHER PUBLICATIONS

Abstract of Japanese Patent—JPH0649187, Feb. 22, 1994, 2 pages.
Abstract of Japanese Patent—JPH06192406, Jul. 12, 1994, 2 pages.
Abstract of Japanese Patent—JPH06192407, Jul. 12, 1994, 2 pages.
Abstract of Japanese Patent—JPH06234835, Aug. 23, 1994, 2 pages.
Abstract of Japanese Patent—JPH0718162, Jan. 20, 1995, 1 page.
Abstract of Japanese Patent—JPH07188403, Jul. 25, 1995, 2 pages.
Abstract of Japanese Patent—JPH0859965, Mar. 5, 1996, 1 page.
Abstract of Japanese Patent—JPH09143347, Jun. 3, 1997, 1 page.
Abstract of Japanese Patent—JPH0919938, Jan. 21, 1997, 1 page.
Abstract of Japanese Patent—JPH09204951, Aug. 5, 1997, 2 pages.
Abstract of Japanese Patent—JPH09249813, Sep. 22, 1997, 2 pages.
Abstract of Japanese Patent—JP09297256, Nov. 18, 1997, 2 pages.
Abstract of Japanese Patent—JPH1160927, Mar. 5, 1999, 2 pages.
Abstract of Japanese Patent—JPH11147999, Jun. 2, 1999, 1 page.
Abstract of Japanese Patent—JP2000026743, Jan. 25, 2000, 1 page.
Abstract of Japanese Patent—JP2000191755, Jul. 11, 2000, 2 pages.
Abstract of Japanese Patent—JP2000313812, Nov. 14, 2000, 1 page.
Abstract of Japanese Patent—JP2001088173, Apr. 3, 2001, 2 pages.
Abstract of Japanese Patent—JP2001106882, Apr. 17, 2001, 1 page.
Abstract of Japanese Patent—JP2003109700, Apr. 11, 2003, 1 page.
Abstract of Japanese Patent—JP2003268252, Sep. 25, 2003, 1 page.
Abstract of Japanese Patent—JP2004182748, Jul. 2, 2004, 1 page.
Abstract of Japanese Patent—JP2004182920, Jul. 2, 2004, 1 page.
Abstract of Japanese Patent—JP2004256656, Sep. 16, 2004, 2 pages.
Abstract of Japanese Patent—JP2004263043, Sep. 24, 2004, 1 page.
Abstract of Japanese Patent—JP2005248052, Sep. 15, 2005, 1 page.
Abstract of Japanese Patent—JP2005276758, Oct. 6, 2005, 2 pages.
Abstract of Japanese Patent—JP2005298772, Oct. 27, 2005, 1 page.
Abstract of Japanese Patent—JP2006008964, Jan. 12, 2006, 1 page.
Abstract of Japanese Patent—JP2007238851, Sep. 20, 2007, 1 page.
Abstract of Japanese Patent—JP2008075079, Apr. 3, 2008, 1 page.
Abstract of Japanese Patent—JP2008138181, Jun. 19, 2008, 1 page.
Abstract of Japanese Patent—JP2009108179, May 21, 2009, 1 page.
Abstract of Japanese Patent—JP2009108180, May 21, 2009, 1 page.
Abstract of Japanese Patent—JP2009191088, Aug. 27, 2009, 1 page.
Abstract of Japanese Patent—JP2010065179, Mar. 25, 2010, 1 page.
Abstract of Japanese Patent—JP2010138228, Jun. 24, 2010, 1 page.
Abstract of Japanese Patent—JP2010174114, Aug. 12, 2010, 1 page.
Abstract of Korean Patent—KR20120052647, May 24, 2012, 1 page.
Abstract of WO Patent—WO2005093908, Oct. 6, 2005, 2 pages.
Abstract of WO Patent—WO2005116141, Dec. 8, 2005, 1 page.
Abstract of WO Patent—WO2006025546, Mar. 9, 2006, 1 page.
Abstract of WO Patent—WO2006123824, Nov. 23, 2006, 1 page.
Abstract of WO Patent—WO2010013578, Feb. 4, 2010, 1 page.
Abstract of WO Patent—WO2012050082, Apr. 19, 2012, 1 page.
Abstract of Taiwan Patent—TW397859, Jul. 11, 2000, 1 page.
Abstract of Taiwan Patent—TW200831584, Aug. 1, 2008, 1 page.
Article—Joseph A. Grande, "Smaller, Thinner Connectors Drive LCP Growth," *Plastic Technology*, Oct. 2007, 4 pages.
Article—Wallenberger, et al., "Glass Fibers," *ASM Handbook*, vol. 21, 2001, pp. 27-34.
Paper—Liu et al., "Surface Mountain of Connectors," Miniaturisation Nepcon Conference during Globlatronics '95, 1995, 15 pages.
Product Information—Compact Camera Module Assembly—Customized Adhesives from Delo Industrial Adhesives, 2010, 12 pages.
Product and Property Guide for DuPont™ Zenite®—LCP—Liquid Crystal Polymer Resin from E. I. du Pont de Nemours and Company, 2006, 33 pages.
Partial Search Report for PCT/US2012/064744 dated Apr. 16, 2013, 4 pages.
Search Report and Written Opinion for PCT/US2012/064744 dated Oct. 14, 2013, 13 pages.
Abstract of German Patent—DE19806837, Aug. 20, 1998, 1 page.
Abstract of Japanese Patent—JPH01230629, Sep. 14, 1989, 2 pages.
Abstract of Japanese Patent—JPH0433946, Feb. 5 1992, 2 pages.
Abstract of Japanese Patent—JPH0476049, Mar. 10, 1992, 2 pages.
Abstract of Japanese Patent—JPH0481451, Mar. 16, 1992, 1 page.
Abstract of Japanese Patent—JPH04292651, Oct. 16, 1992, 2 pages.
Abstract of Japanese Patent—JPH05140282, Jun. 8, 1993, 1 page.
Abstract of Japanese Patent—JPH08231832, Sep. 10, 1996, 2 pages.
Abstract of Japanese Patent—JPH08283556, Oct. 29, 1996, 1 page.
Abstract of Japanese Patent—JPH08325441, Dec. 10, 1996, 1 page.
Abstract of Japanese Patent—JP2000080289, Mar. 21, 2000, 1 page.
Abstract of Japanese Patent—JP2001129856, May 15, 2001, 2 pages.
Abstract of Japanese Patent—JP2000273292, Oct. 3, 2000, 1 page.
Abstract of Japanese Patent—JP2006070086, Mar. 16, 2006, 1 page.
Abstract of Japanese Patent—JP2010037364, Feb. 18, 2010., 1 page.
Abstract of Japanese Patent—JP2010059399, Mar. 18, 2010, 1 page.
Abstract of WO Patent—WO2066123824, Nov. 23, 2006, 1 page.

* cited by examiner

US 9,353,263 B2

FINE PITCH ELECTRICAL CONNECTOR AND A THERMOPLASTIC COMPOSITION FOR USE THEREIN

RELATED APPLICATIONS

The present application claims priority to U.S. Provisional Applications Ser. Nos. 61/559,839, filed on Nov. 15, 2011, and 61/641,390, filed on May 2, 2012, which are incorporated herein in their entirety by reference thereto.

BACKGROUND OF THE INVENTION

Electrical connectors are often employed to detachably mount a central processing unit ("CPU") to a printed circuit board. The connector may, for example, contain an injection molded housing that is formed from a thermoplastic resin. Recent demands on the electronic industry have dictated an increase in the scale of a CPU circuit, which in turn dictates an increase in the number of contact pins used for connection. To help accomplish the desired performance, the pitch of these pins has generally decreased to accommodate the larger number of contact pins required within a given space. Electrical connectors must therefore also include insertion passageways corresponding to each of these fine pitch contact pins. As the pitch of the contact pins decreases, the pitch of the pin insertion passageways and the width of the opposing walls that partition those passageways must also decrease. Unfortunately, it is often difficult to adequately fill a mold of such a thin width with a thermoplastic resin. Further, mechanical strength may also become problematic. Attempts to solve this problem have included the addition of milled glass powder to the thermoplastic resin; however, this considerably raises the price of the connector and is thus undesirable.

As such, a need exists for a thermoplastic composition that can be used in fine pitch electrical connectors, and yet still achieve good mechanical properties.

SUMMARY OF THE INVENTION

In accordance with one embodiment of the present invention, an electrical connector is disclosed that comprises at least two opposing walls between which a passageway is defined for receiving a contact pin, wherein the walls have a width of about 500 micrometers or less. The walls are formed from a thermoplastic composition that comprises from about 20 wt. % to about 90 wt. % of at least one thermotropic liquid crystalline polymer and from about 2 wt. % to about 40 wt. % of fibers. The ratio of the width of at least one of the walls to the volume average length of the fibers is from about 0.8 to about 3.2. The fibers have a volume average length of from about 80 to about 250 micrometers, and at least about 70% by volume of the fibers have a length of from about 80 to about 250 micrometers.

In accordance with another embodiment of the present invention, a thermoplastic composition is disclosed that comprises from about 20 wt. % to about 90 wt. % of at least one thermotropic liquid crystalline polymer, from about 2 wt. % to about 40 wt. % of glass fibers, and from about 1 wt. % to about 40 wt. % of at least one mineral filler. The glass fibers have a volume average length of from about 100 to about 200 micrometers, and at least about 70% by volume of the fibers have a length of from about 100 to about 200 micrometers.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
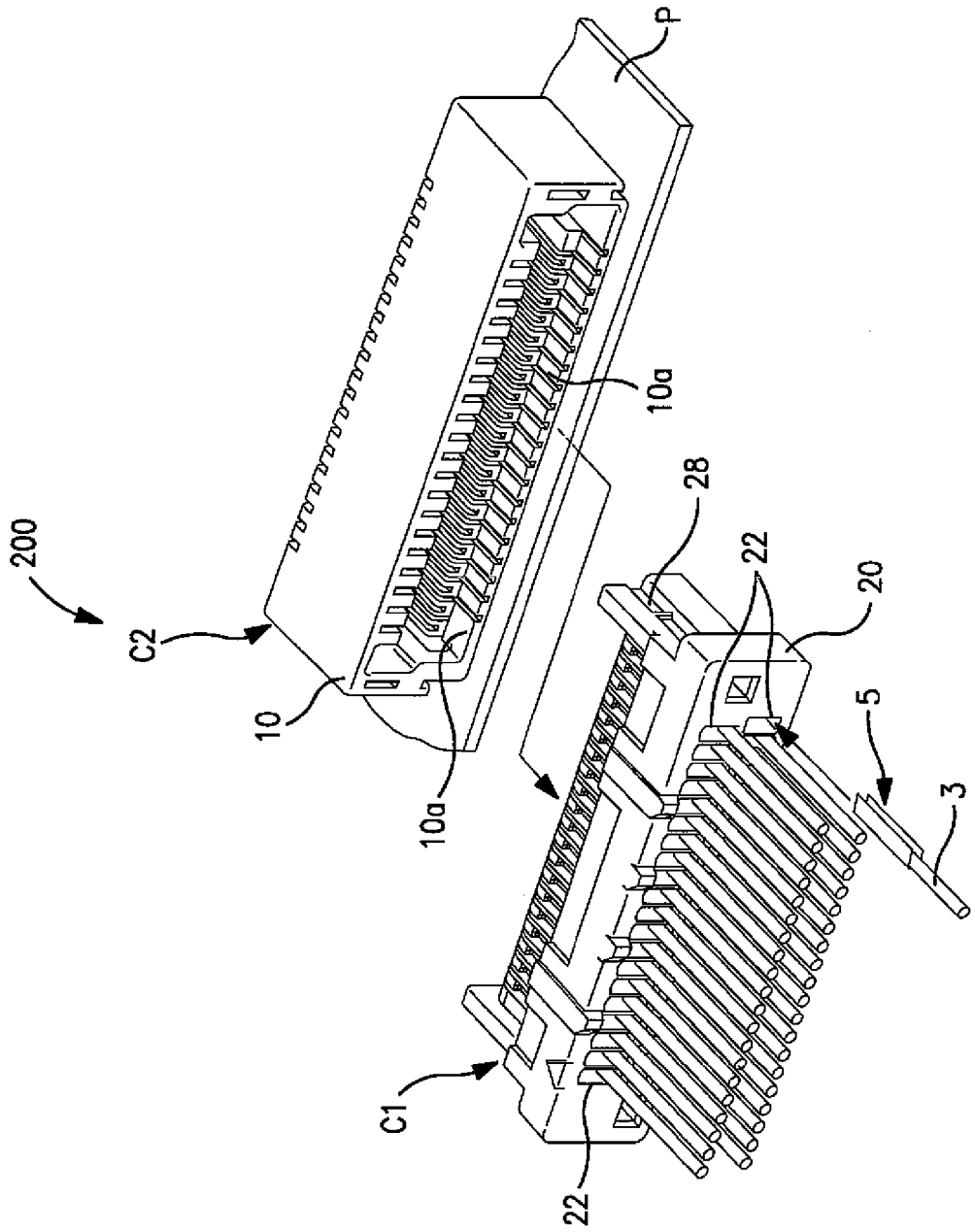
FIG. 1 is an exploded perspective view of one embodiment of a fine pitch electrical connector that may be formed according to the present invention.

It is to be understood by one of ordinary skill in the art that the present discussion is a description of exemplary embodiments only, and is not intended as limiting the broader aspects of the present invention.

Generally speaking, the present invention is directed to a thermoplastic composition for use in a fine pitch electrical connector. The thermoplastic composition contains a liquid crystalline polymer and a plurality of fibers. The volume average length of the fibers in the thermoplastic composition is selectively controlled according to the present invention so that it is within the range of from about 80 to about 250 micrometers, in some embodiments from about 100 to about 200 micrometers, and in some embodiments, from about 110 to about 180 micrometers. The fibers also have a narrow length distribution. That is, at least about 70% by volume of the fibers, in some embodiments at least about 80% by volume of the fibers, and in some embodiments, at least about 90% by volume of the fibers have a length within the range of from about 80 to about 250 micrometers, in some embodiments from about 100 to about 200 micrometers, and in some embodiments, from about 110 to about 180 micrometers.

Through the use of a liquid crystalline polymer and fibers of a certain weight average length and narrow length distribution, the present inventors have discovered that the resulting thermoplastic composition is able to achieve a desirable combination of strength and flowability, which enables it to be uniquely suited for the walls of a fine pitch connector. For example, the thermoplastic composition may be used to form opposing walls of a connector housing. The walls have a relatively small width, such as about 500 micrometers or less, in some embodiments from about 100 to about 450 micrometers, and in some embodiments, from about 200 to about 400 micrometers. When formed from the thermoplastic composition of the present invention, the ratio of the width of at least one of the walls to the volume average length of the fibers is from about 0.8 to about 3.2, in some embodiments from about 1.0 to about 3.0, and in some embodiments, from about 1.2 to about 2.9.

The fibers used in the thermoplastic composition generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is desirable for connector housings, the high strength fibers may be formed from materials that are also generally insulative in nature, such as glass, ceramics (e.g., alumina or silica), aramids (e.g., Kevlar® marketed by E. I. DuPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. In addition to possessing the length characteristics noted above, the fibers may also have a relatively high aspect ratio (average length divided by nominal diameter) to help improve the mechanical properties of the resulting thermoplastic composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the thermoplastic composition is also selectively controlled to help achieve the desired mechanical properties without adversely impacting other properties of the composition, such as its flowability. For example, the fibers typically constitute from about 2 wt. % to about 40 wt. %, in some embodiments from about 5 wt. % to about 35 wt. %, and in some embodiments, from about 6 wt. % to about 30 wt. % of the thermoplastic composition. Although the fibers may be employed within the ranges noted above, one particularly beneficial and surprising aspect of the present invention is that small fiber contents may be employed while still achieving the desired mechanical properties. Without intending to be limited by theory, it is believed that the narrow length distribution of the fibers can help achieve excellent mechanical properties, thus allowing for the use of a smaller amount of fibers. For example, the fibers can be employed in small amounts such as from about 2 wt. % to about 20 wt. %, in some embodiments from about 5 wt. % to about 16 wt. %, and in some embodiments, from about 6 wt. % to about 12 wt. %.

In addition to fibers, the thermoplastic composition of the present invention employs at least one thermotropic liquid crystalline polymer, which has a high degree of crystallinity that enables it to effectively fill the small spaces of the mold used to form walls of the electrical connector. The amount of such liquid crystalline polymers is typically from about 20 wt. % to about 90 wt. %, in some embodiments from about 30 wt. % to about 80 wt. %, and in some embodiments, from about 40 wt. % to about 75 wt. % of the thermoplastic composition. Suitable thermotropic liquid crystalline polymers may include aromatic polyesters, aromatic poly(esteramides), aromatic poly(estercarbonates), aromatic polyamides, etc., and may likewise contain repeating units formed from one or more aromatic hydroxycarboxylic acids, aromatic dicarboxylic acids, aromatic diols, aromatic aminocarboxylic acids, aromatic amines, aromatic diamines, etc., as well as combinations thereof.

Aromatic polyesters, for instance, may be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof.

In one particular embodiment, the aromatic polyester contains monomer repeat units derived from 4-hydroxybenzoic acid ("HBA") and 2,6-hydroxynaphthoic acid ("HNA") and/or 2,6-naphthalenedicarboxylic acid ("NDA"), as well as other optional repeat units, such as terephthalic acid ("TA") and/or isophthalic acid ("IA"); hydroquinone ("HQ"), 4,4-biphenol ("BP"), and/or acetaminophen ("APAP"); etc., as well as a combination thereof. The monomer units derived from HBA may constitute from about 40% to about 75% of the polymer on a mole basis and the monomer units derived from HNA and/or NDA may constitute from about 1% to about 25% of the polymer on a mole basis. The monomer units derived from TA and/or IA may constitute from about 2% to about 25% of the polymer on a mole basis. Likewise, the monomer units derived from HQ, BP, and/or APAP may constitute from about 10% to about 35% of the polymer on a mole basis. Suitable aromatic polyesters are commercially available from Ticona, LLC under the trade designation VECTRA® A. The synthesis and structure of these and other aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

Liquid crystalline polyesteramides may likewise be obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide contains monomer units derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. Such aromatic polyesters are commercially available from Ticona, LLC under the trade designation VECTRA® B. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

The liquid crystalline polymers may be prepared by introducing the appropriate monomer(s) (e.g., aromatic hydroxycarboxylic acid, aromatic dicarboxylic acid, aromatic diol, aromatic amine, aromatic diamine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, Ill, et al.; U.S. Pat. No. 6,514,611 to Shepherd, et al.; and WO 2004/058851 to Waggoner, which are incorporated herein in their entirety by reference thereto for all relevant purposes. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as referenced above and known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C., Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., 4-hydroxybenzoic acid and 2,6-hydroxynaphthoic acid) and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting liquid crystalline polymer typically may have a high number average molecular weight ($M_n$) of about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about about 4 deciliters per gram ("dL/g") or more, in some embodiments about 5 dL/g or more, in some embodiments from about 6 to about 20 dig, and in some embodiments from about 7 to about 15 dL/g. Intrinsic viscosity may be determined in accordance with ISO-1628-5 using a 50/50 (v/v) mixture of pentafluorophenol and hexafluoroisopropanol.

In addition to the components noted above, still other additives that can be included in the composition may include, for instance, antimicrobials, fillers, pigments, antioxidants, stabilizers, surfactants, waxes, flow promoters, solid solvents, and other materials added to enhance properties and processability. For instance, mineral fillers may be employed in the thermoplastic composition to help achieve the desired mechanical properties and/or appearance. When employed, such mineral fillers typically constitute from about 1 wt. % to about 40 wt. %, in some embodiments from about 2 wt. % to about 35 wt. %, and in some embodiments, from about 5 wt. % to about 30 wt. % of the thermoplastic composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Lubricants may also be employed in the thermoplastic composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the thermoplastic composition.

The liquid crystalline polymer, fibers, and other optional additives may be melt blended together within a temperature range of from about 200° C. to about 450° C., in some embodiments, from about 220° C. to about 400° C., and in some embodiments, from about 250° C. to about 350° C. to form the thermoplastic composition. Any of a variety of melt blending techniques may generally be employed in the present invention. For example, the components (e.g., liquid crystalline polymer, fibers, etc.) may be supplied separately or in combination to an extruder that includes at least one screw rotatably mounted and received within a barrel (e.g., cylindrical barrel) and may define a feed section and a melting section located downstream from the feed section along the length of the screw.

Figure 3:
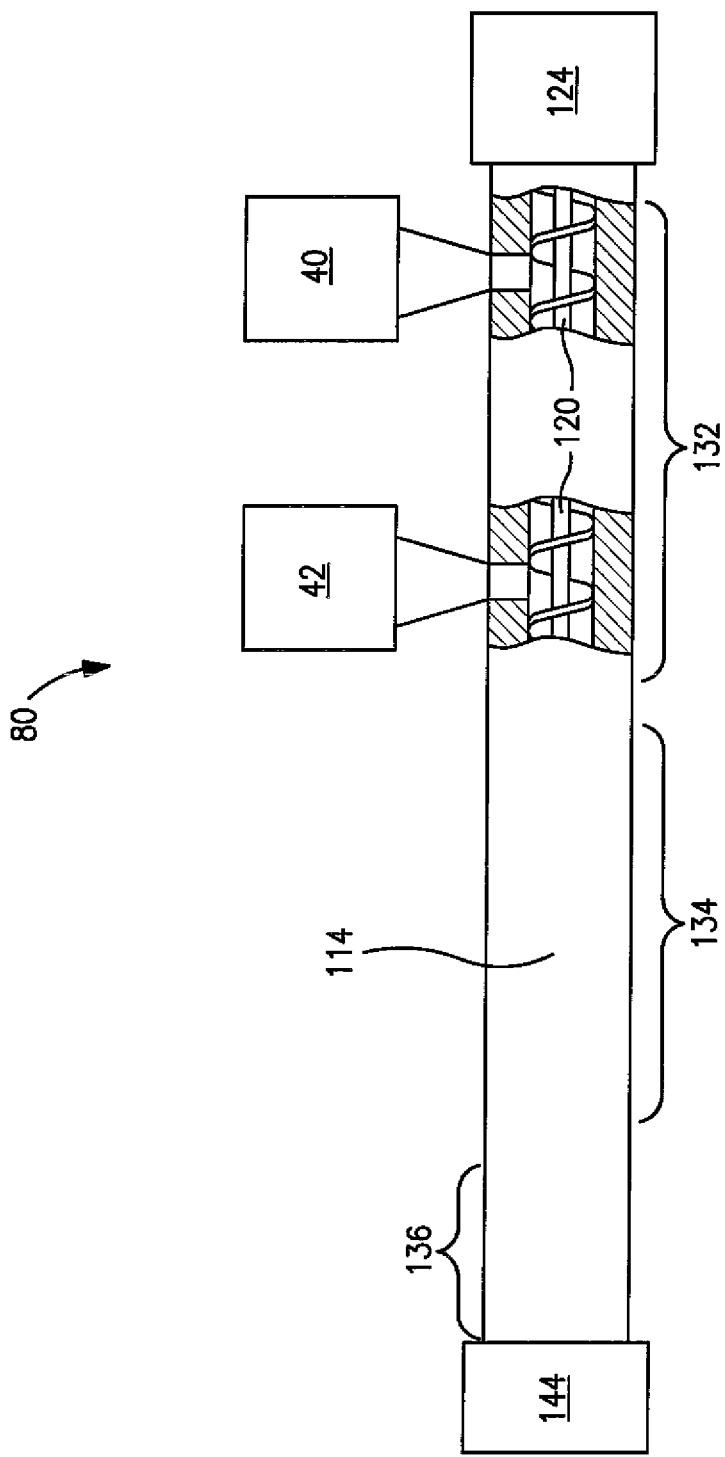
FIG. 3 is a schematic illustration of one embodiment of an extruder screw that may be used to form the thermoplastic composition of the present invention.

The extruder may be a single screw or twin screw extruder. Referring to FIG. 3, for example, one embodiment of a single screw extruder 80 is shown that contains a housing or barrel 114 and a screw 120 rotatably driven on one end by a suitable drive 124 (typically including a motor and gearbox). If desired, a twin-screw extruder may be employed that contains two separate screws. The configuration of the screw is not particularly critical to the present invention and it may contain any number and/or orientation of threads and channels as is known in the art. As shown in FIG. 3, for example, the screw 120 contains a thread that forms a generally helical channel radially extending around a core of the screw 120. A hopper 40 is located adjacent to the drive 124 for supplying the liquid crystalline polymer and/or other materials through an opening in the barrel 114 to the feed section 132. Opposite the drive 124 is the output end 144 of the extruder 80, where extruded plastic is output for further processing.

A feed section 132 and melt section 134 are defined along the length of the screw 120. The feed section 132 is the input portion of the barrel 114 where the liquid crystalline polymer is added. The melt section 134 is the phase change section in which the liquid crystalline polymer is changed from a solid to a liquid. While there is no precisely defined delineation of these sections when the extruder is manufactured, it is well within the ordinary skill of those in this art to reliably identify the feed section 132 and the melt section 134 in which phase change from solid to liquid is occurring. Although not necessarily required, the extruder 80 may also have a mixing section 136 that is located adjacent to the output end of the barrel 114 and downstream from the melting section 134. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

The fibers of the thermoplastic composition may generally be added at any location of the extruder, such as to the hopper 40 or at a location downstream therefrom. In one particular embodiment, the fibers may be added a location downstream from the point at which the liquid crystalline polymer is supplied, but yet prior to the melting section. In FIG. 3, for instance, a hopper 42 is shown that is located within a zone of the feed section 132 of the extruder 80. The fibers supplied to the hopper 42 may be initially relatively long, such as having a volume average length of from about 1,000 to about 5,000 micrometers, in some embodiments from about 2,000 to about 4,500 micrometers, and in some embodiments, from about 3,000 to about 4,000 micrometers. Nevertheless, by supplying these long fibers at a location where the liquid crystalline polymer is still in a solid state, the present inventors have discovered that the polymer can act as an abrasive agent for reducing the volume average length of the fibers to the ranges noted above. The present inventors have also found that the length reduction is consistent throughout the composition, which can result in a narrow length distribution.

To help control the degree to which the length of the fibers are reduced during extrusion, a variety of different parameters may also be selectively controlled. For example, the ratio of the length ("L") to diameter ("D") of the screw may be selected to achieve an optimum balance between throughput and fiber length reduction. The L/D value may, for instance, range from about 15 to about 50, in some embodiments from about 20 to about 45, and in some embodiments from about 25 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. Perhaps even more important than the total L/D ratio of the screw is the L/D ratio of the screw after the point at which the fibers are supplied. More particularly, the screw has a blending length ("$L_B$") that is defined from the point at which the fibers are supplied to the extruder to the end of the screw, the blending length being less than the total length of the screw. As noted above, it may be desirable to add the fibers before the liquid crystalline polymer is melted, which means that the $L_B$/D ratio would be relatively high. However, too high of a $L_B$/D ratio could result in degradation of the polymer. Therefore, the $L_B$/D ratio of the screw after the point at which the fibers are supplied is typically from about 4 to about 20, in some embodiments from about 5 to about 15, and in some embodiments, from about 6 to about 10.

In addition to the length and diameter, other aspects of the extruder may also be selected to achieve the desired fiber length. For example, the speed of the screw may be selected to achieve the desired residence time, shear rate, melt processing temperature, etc. Generally, an increase in frictional energy results from the shear exerted by the turning screw on the materials within the extruder and results in the fracturing of the fibers. The degree of fracturing may depend, at least in part, on the screw speed. For example, the screw speed may range from about 50 to about 200 revolutions per minute ("rpm"), in some embodiments from about 70 to about 150 rpm, and in some embodiments from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

In the embodiments described above, the length of the fibers is reduced within the extruder. It should be understood, however, that this is by no means a requirement of the present invention. For example, the fibers may simply be supplied to the extruder at the desired length. In such embodiments, the fibers may, for example, be supplied at the mixing and/or melting sections of the extruder, or even at the feed section in conjunction with the liquid crystalline polymer.

Regardless of the manner in which it is formed, the melt viscosity of the resulting thermoplastic composition is generally low enough so that it can readily flow into the cavity of a mold to form the walls of a fine pitch connector. For example, in one particular embodiment, the thermoplastic composition may have a melt viscosity of from about 0.5 to about 100 Pa-s, in some embodiments from about 1 to about 80 Pa-s, and in some embodiments, from about 5 to about 50 Pa-s, determined at a shear rate of 1000 seconds$^{-1}$. Melt viscosity may be determined in accordance with ASTM Test No. 1238-70 at a temperature of 350° C.

To help achieve the desired melt viscosity, one or more functional compounds may be employed as flow modifiers that interact with the liquid crystalline polymer to reduce its melt viscosity. The functional compounds used herein may be mono-, di-, trifunctional, etc., and may contain one or more reactive functional groups, such as hydroxyl, carboxyl, carboxylate, ester, and primary or secondary amines. Hydroxy-functional compounds are particularly suitable flow modifiers as they contain hydroxyl functional groups that can react with the polymer chain to shorten its length and thus reduce melt viscosity. When employed, such hydroxy-functional compounds typically constitute from about 0.05 wt. % to about 4 wt. % of the thermoplastic composition. One example of such a hydroxyl-functional compound is an aromatic diol, such as hydroquinone, resorcinol, 4,4'-biphenol, etc., as well as combinations thereof. Such aromatic diols may constitute from about 0.01 wt. % to about 1 wt. %, and in some embodiments, from about 0.05 wt. % to about 0.4 wt. % of the thermoplastic composition. Water is also a suitable hydroxyl-functional compound, and can be used alone or in combination with other hydroxyl-functional compounds. If desired, water can be added in a form that under process conditions generates water. For example, the water can be added as a hydrate that under the process conditions (e.g., high temperature) effectively "loses" water. Such hydrates include alumina trihydrate, copper sulfate pentahydrate, barium chloride dihydrate, calcium sulfate dehydrate, etc., as well as combinations thereof. When employed, the hydrates may constitute from about 0.02 wt. % to about 2 wt. %, and in some embodiments, from about 0.05 wt. % to about 1 wt. % of the thermoplastic composition.

In addition to those noted above, still other functional compounds may also be employed as flow modifiers in the thermoplastic composition. For instance, aromatic dicarboxylic acids can be employed that generally act to combine smaller chains of the polymer together after they have been cut by other types of functional compounds. This maintains the mechanical properties of the composition even after its melt viscosity has been reduced. Suitable aromatic dicarboxylic acids for this purpose may include, for instance, terephthalic acid, 2,6-napthalenedicarboxylic acid, isophthalic acid, 4,4'-bibenzoic acid, 2-methylterephthalic acid, etc., as well as combinations thereof. When employed, such dicarboxylic acids typically constitute from about 0.001 wt. % to about 0.5 wt. %, and in some embodiments, from about 0.005 wt. % to about 0.1 wt. % of the thermoplastic composition. In one particular embodiment, the thermoplastic composition of the present invention employs a mixture that contains a combination of an aromatic diol, hydrate, and aromatic dicarboxylic acid. The present inventors have discovered that this specific combination of ingredients can reduce melt viscosity and improve flow, but without having an adverse impact on mechanical properties. Typically, of the flow modifiers employed in the thermoplastic composition, aromatic diols constitute from about 15 wt. % to about 45 wt. %, hydrates constitutes from about 45 wt. % to about 75 wt. %, and aromatic dicarboxylic acids constitute from about 1 wt. % to about 15 wt. %.

Conventionally, it was believed that thermoplastic compositions having such the low viscosity noted above would not also possess sufficiently good thermal and mechanical properties to enable their use in certain types of applications. Contrary to conventional thought, however, the thermoplastic composition of the present invention has been found to possess both excellent thermal and mechanical properties. For example, the composition may possess a high impact strength, which is useful when forming the thin walls of fine pitch connectors. The composition may, for instance, possess a Charpy notched impact strength greater than about 4 kJ/m$^2$, in some embodiments from about 5 to about 40 kJ/m$^2$, and in some embodiments, from about 6 to about 30 kJ/m$^2$, measured at 23° C. according to ISO Test No. 179-1) (technically equivalent to ASTM D256, Method B). The tensile and flexural mechanical properties of the composition are also good. For example, the thermoplastic composition may exhibit a tensile strength of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 20,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C. The thermoplastic composition may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 5,000 MPa to about 20,000 MPa, in some embodiments from about 8,000 MPa to about 20,000 MPa, and in some embodiments, from about 10,000 MPa to about 15,000 MPa. The flexural properties may be determined in accordance with ISO Test No. 178 (technically equivalent to ASTM D790) at 23° C.

The melting temperature of the composition may likewise be from about 250° C. to about 400° C., in some embodiments from about 270° C. to about 380° C., and in some embodiments, from about 300° C. to about 360° C. The melting temperature may be determined as is well known in the art using differential scanning calorimetry ("DSC"), such as determined by ISO Test No. 11357. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.66 to about 0.95, and in some embodiments, from about 0.67 to about 0.85. The specific DTUL values may, for instance, range from about 200° C. to about 300° C., in some embodiments from about 210° C. to about 280° C., and in some embodiments, from about 215° C. to about 260° C. Such high DTUL values can, among other things, allow the use of high speed processes often employed during the manufacture of connectors.

The thermoplastic composition may be molded into the desired shape using techniques as is known in the art. Typically, the shaped parts are molded using a one-component injection molding process in which dried and preheated plastic granules are injected into the mold. The resulting connector may have any of a variety of different configurations. One particularly suitable fine pitch electrical connector is shown in FIG. 1. An electrical connector 200 is shown that a board-side portion C2 that can be mounted onto the surface of a circuit board P. The connector 200 may also include a wiring material-side portion C1 structured to connect discrete wires 3 to the circuit board P by being coupled to the board-side connector C2. The board-side portion C2 may include a first housing 10 that has a fitting recess 10a into which the wiring material-side connector C1 is fitted and a configuration that is slim and long in the widthwise direction of the housing 10. The wiring material-side portion C1 may likewise include a second housing 20 that is slim and long in the widthwise direction of the housing 20. In the second housing 20, a plurality of terminal-receiving cavities 22 may be provided in parallel in the widthwise direction so as to create a two-tier array including upper and lower terminal-receiving cavities 22. A terminal 5, which is mounted to the distal end of a discrete wire 3, may be received within each of the terminal-receiving cavities 22. If desired, locking portions 28 (engaging portions) may also be provided on the housing 20 that correspond to a connection member (not shown) on the board-side connector C2.

Figure 2:
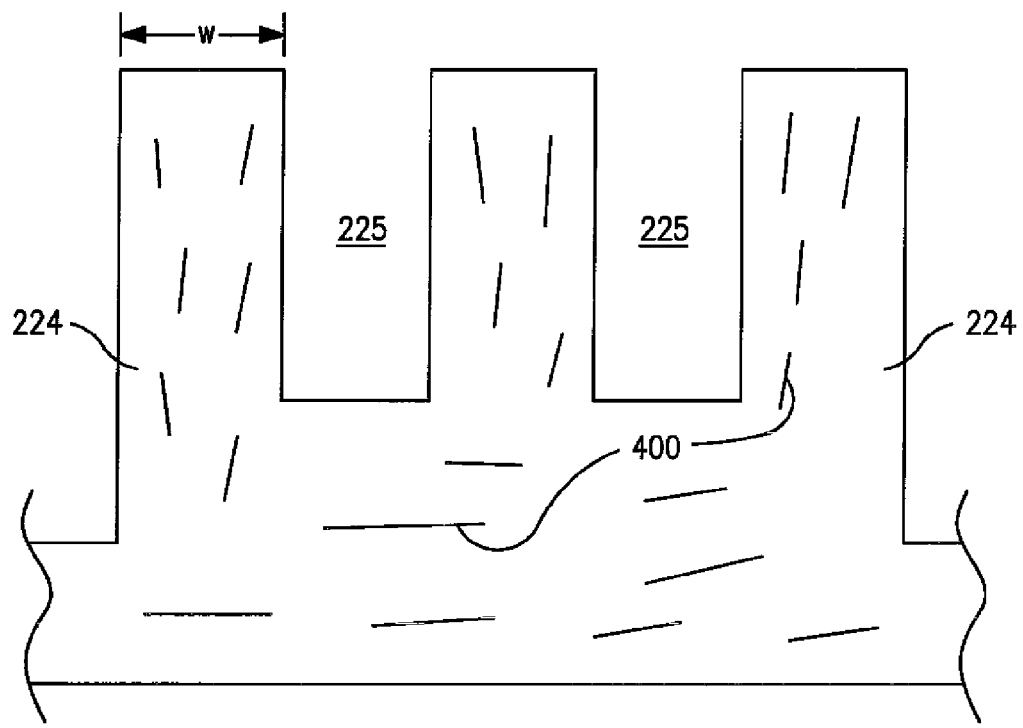
FIG. 2 is a front view of opposing walls of the fine pitch electrical connector of FIG. 1.

As discussed above, the interior walls of the first housing 10 and/or second housing 20 may have a relatively small width dimension, and can be formed from the thermoplastic composition of the present invention. The walls are, for example, shown in more detail in FIG. 2. As illustrated, insertion passageways or spaces 225 are defined between opposing walls 224 that can accommodate contact pins. The walls 224 have a width "w" that is within the ranges noted above. When the walls 224 are formed from a thermoplastic composition containing fibers (e.g., element 400), such fibers may have a volume average length and narrow length distribution within a certain range to best match the width of the walls. For example, the ratio of the width of at least one of the walls to the volume average length of the fibers is from about 0.8 to about 3.2, in some embodiments from about 1.0 to about 3.0, and in some embodiments, from about 1.2 to about 2.9.

In addition to or in lieu of the walls, it should also be understood that any other portion of the housing may also be formed from the thermoplastic composition of the present invention. For example, the connector may also include a shield that encloses the housing. Some or all of the shield may be formed from the thermoplastic composition of the present invention. For example, the housing and the shield can each be a one-piece structure unitarily molded from the thermoplastic composition. Likewise, the shield can be a two-piece structure that includes a first shell and a second shell, each of which may be formed from the thermoplastic composition of the present invention.

The present invention may be better understood with reference to the following examples.

Test Methods

Melt Viscosity:

The melt viscosity (Pa-s) was determined in accordance with ISO Test No. 11443 at 350° C. and at a shear rate of 1000 s$^{-1}$ using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Melting Temperature:

The melting temperature ("Tm") was determined by differential scanning calorimetry ("DSC") as is known in the art. The melting temperature is the differential scanning calorimetry (DSC) peak melt temperature as determined by ISO Test No. 11357. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Tensile Modulus, Tensile Stress, and Tensile Elongation:

Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Modulus, Flexural Stress, and Flexural Strain:

Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Notched Charpy Impact Strength:

Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Fiber Length:

The volume average fiber length is determined by initially placing several pellet samples (e.g., 7 or 8) in a muffle furnace at 420° C. overnight. The resulting ash is immersed in an aqueous solution containing a glycerol surfactant to disperse the glass fibers. The aqueous solution is then placed on a glass slide and images are collected via image analysis system. Glass fibers are selectively chosen from the images by ImagePro™ software, and the software automatically measures the length of the selected glass fiber based on calibrated length. Measurement continues until at least 500 glass fibers are counted. Then, the volume average fiber length and distribution are calculated.

Weldline Strength:

The weldline strength is determined by first forming an injection molded line grid array ("LGA") connector (size of 49 mm×39 mm×1 mm) from a thermoplastic composition sample as is well known in the art. Once formed, the LGA connector is placed on a sample holder. The center of the connector is then subjected to a tensile force by a rod moving at a speed of 5.08 millimeters per minute. The peak stress is recorded as an estimate of the weldline strength.

EXAMPLE 1

Three (3) samples of a thermoplastic composition are formed from 67.375 wt. % of a liquid crystalline polymer, 10 wt. % glass fibers, 22 wt. % talc, 0.3 wt. % Glycolube™ P, 0.2 wt. % alumina trihydrate, 0.1 wt. % 4,4'-biphenol, and 0.025 wt. % 2,6-napthalene dicarboxylic acid ("NDA"). The liquid crystalline polymer is formed from 4-hydroxybenzoic acid ("HBA"), 2,6-hydroxynaphthoic acid ("HNA"), terephthalic acid ("TA"), 4,4'-biphenol ("BP"), and acetaminophen ("APAP"), such as described in U.S. Pat. No. 5,508,374 to Lee, et al. The glass fibers are obtained from Owens Corning and had an initial length of 4 millimeters.

To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 25 millimeters, and the L/D ratio is 30. The extruder has Temperature Zones 1-9, which may be set to the following temperatures: 330° C., 330° C., 310° C., 310° C., 310° C., 310° C., 320° C., 320° C., and 320° C., respectively. For Samples 1-2, the screw design is selected so that melting occurs after Zone 4. For Sample 3, the screw design is selected so that melting begins prior to Zone 4. The polymer is supplied to the feed throat by means of a volumetric feeder. The glass fibers and talc are fed to Zones 4 and/or 6 as indicated in the table below. Once melt blended, the samples are extruded through a single-hole strand die, cooled through a water bath, and pelletized.

The samples are then tested for fiber length in the manner indicated above. The results are set forth in Table 1 below.

TABLE 1

|  | Sample 1 | Sample 2 | Sample 3 |
|---|---|---|---|
| Feeding sequence | Glass fibers at Zone #4; Talc at Zone #6 | Glass fibers at Zone #6; Talc at Zone #4 | Glass fibers at Zone #4; Talc at Zone #6 |
| L/D after GF feeding | 7.75 | 3.90 | 6.75 |
| L/D before GF feeding | 0 | 3.85 | 4.80 |
| Glass fiber length | | | |
| Vol. Average (μm) | 140 | 390 | 320 |
| Vol. Standard Deviation | 0.07 | 0.27 | 0.20 |
| Max | 0.41 | 1.56 | 0.98 |
| Count | 1187 | 1462 | 794 |
| Coefficient of Variance (%) | 51 | 96 | 89 |

Figure 4:
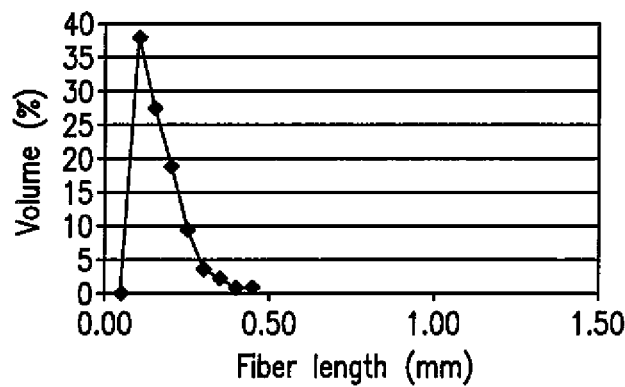
FIGS. 4-6 are graphs of the fiber length distribution for Samples 1-3 of Example 1.
Figure 5:
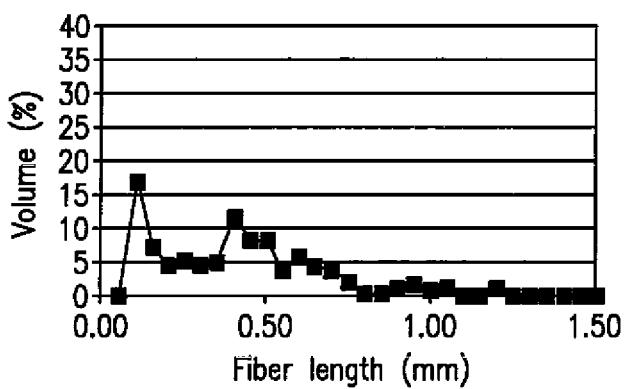
Figure 6:
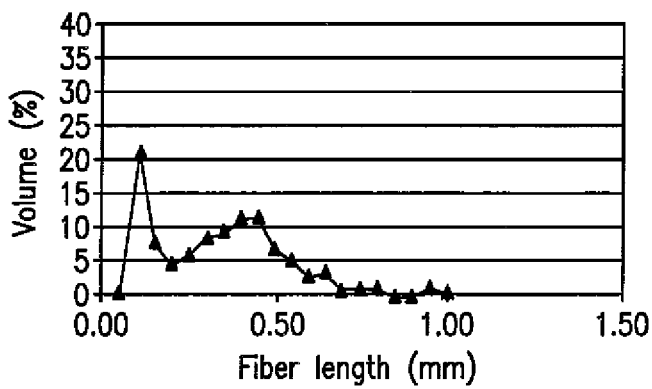
Figure 7:
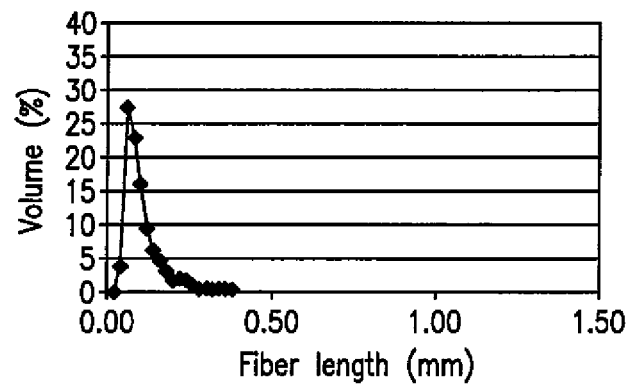
FIGS. 7-12 are graphs of the fiber length distribution for Samples 4-9 of Example 2.
Figure 8:
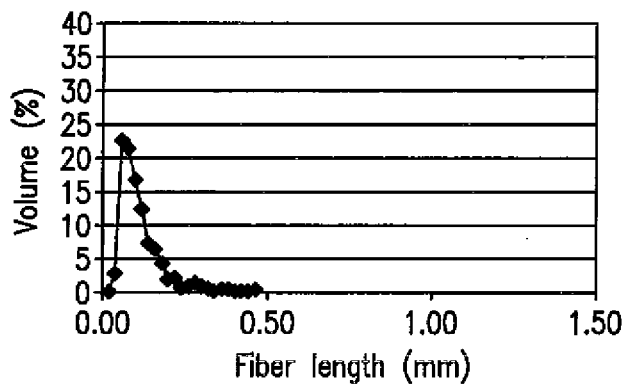
Figure 9:
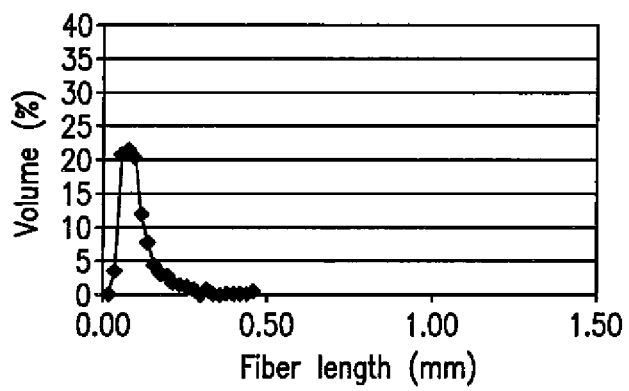
Figure 10:
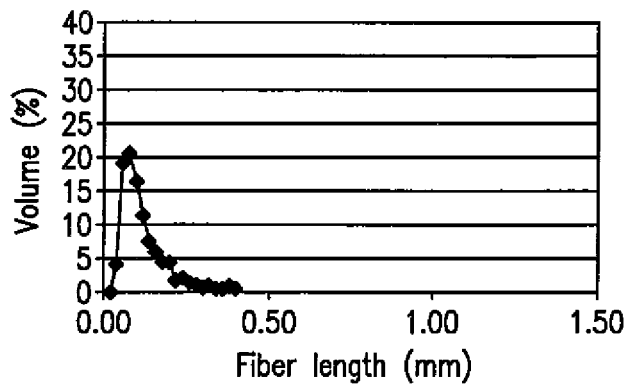
Figure 11:
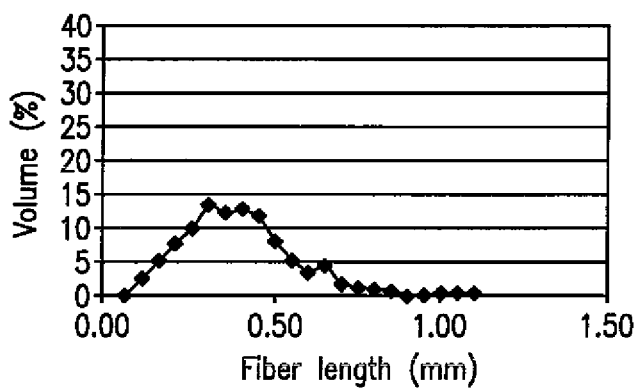
Figure 12:
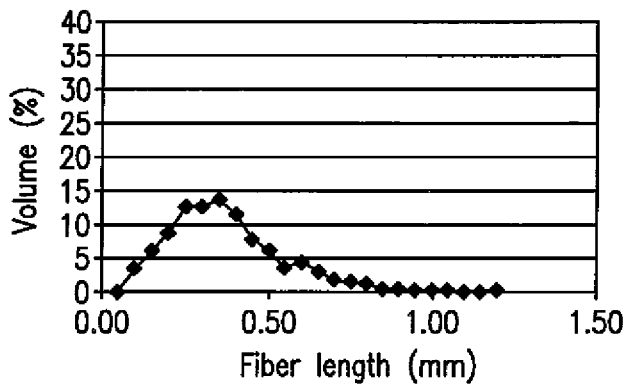
Figure 13:
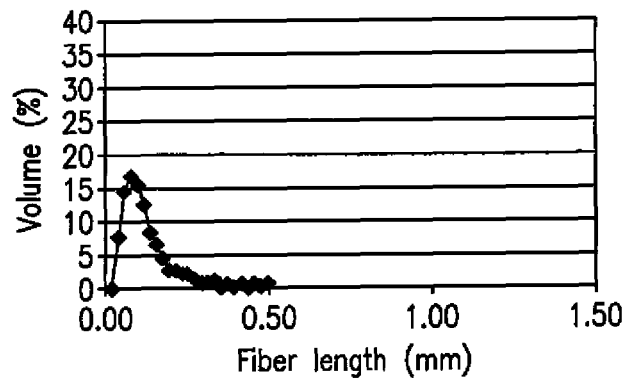
FIGS. 13-20 are graphs of the fiber length distribution for Samples 10-17 of Example 3.
Figure 14:
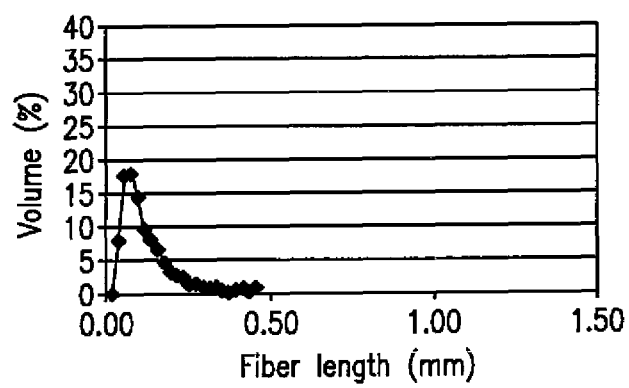
Figure 15:
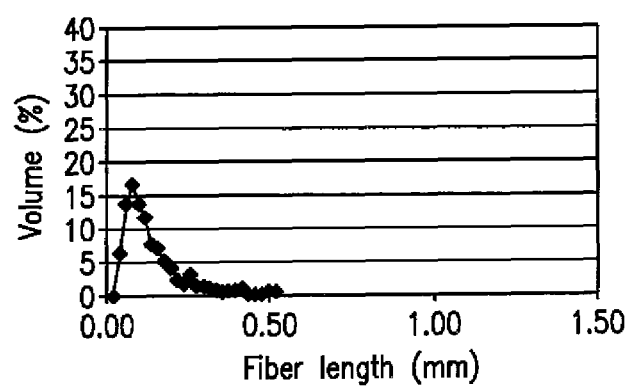
Figure 16:
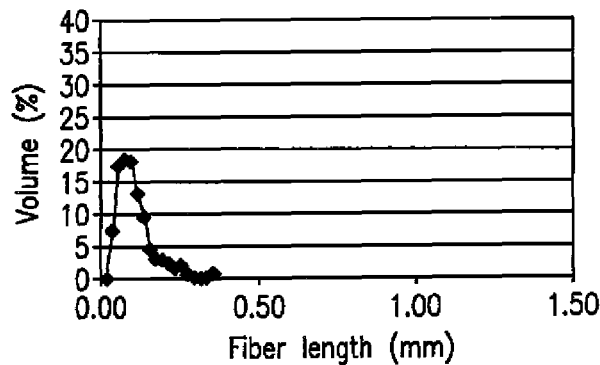
Figure 17:
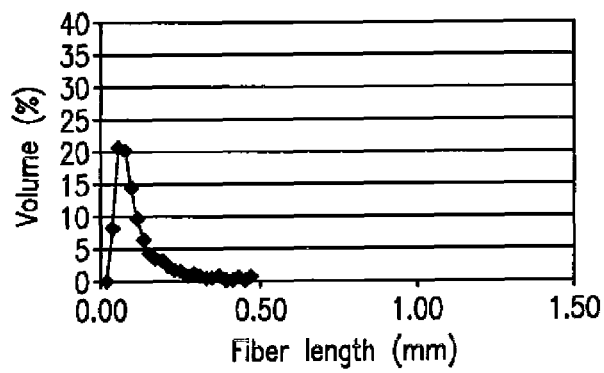
Figure 18:
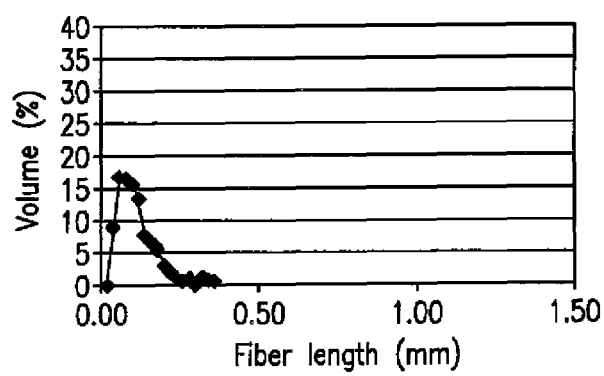
Figure 19:
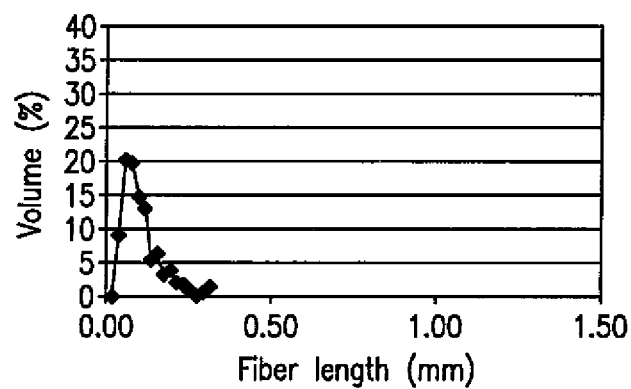
Figure 20:
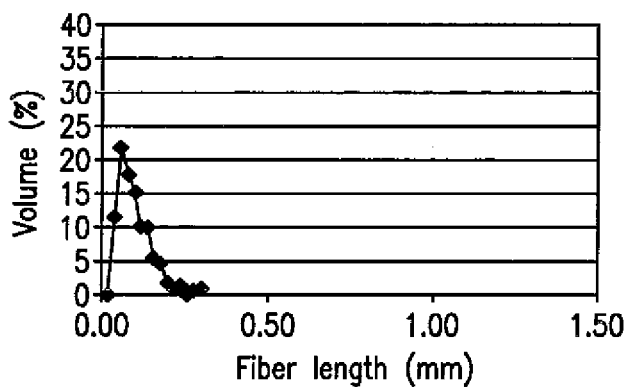

The length distribution of the fibers of Samples 1-3 is also shown in FIGS. 4-6, respectively. As indicated in Table 1 and FIGS. 4-6, when the glass fibers are fed at Zone #4 (Sample 1, L/D after glass fiber feeding=7.75), the fiber length becomes effectively shorter and its distribution is narrower. When fed at Zone #6 (Sample 2, L/D after glass fiber feeding=3.90) or at Zone #4 but after melting of the polymer (Sample 3, L/D after glass fiber feeding=4.80), however, no significant change in length is observed.

Parts are injection molded from Samples 1-3 and tested for their thermal and mechanical properties. The results are set forth below in Table 2.

TABLE 2

|  | Sample 1 | Sample 2 | Sample 3 |
|---|---|---|---|
| Melt Viscosity at 1000 s$^{-1}$ and 350° C. (Pa-s) | 18.4 | 17.6 | 19.3 |
| Melt Viscosity at 400 s$^{-1}$ and 350° C. (Pa-s) | 23 | 24.9 | 24.2 |
| DTUL @ 1.8 Mpa (° C.) | 238 | 254 | 247 |
| Ten. Brk stress (MPa) | 118 | 125 | 122 |
| Ten. Modulus (MPa) | 10,711 | 11,811 | 11,318 |
| Ten. Brk strain (%) | 2.6 | 2.1 | 2.4 |
| Flex Brk stress (MPa) | 139 | 166 | 161 |
| Flex modulus (MPa) | 10,941 | 11,496 | 12,102 |
| Flex Brk strain (%) | 3.1 | 2.5 | 2.6 |
| Charpy Notched (KJ/m$^2$) | 7.5 | 18.0 | 9.7 |

EXAMPLE 2

Six (6) samples of a thermoplastic composition are formed from 49.375 wt. % of a liquid crystalline polymer, 30 wt. % glass fibers, 20 wt. % talc, 0.3 wt. % Glycolube™ P, 0.2 wt. % alumina trihydrate, 0.1 wt. % 4,4'-biphenol, and 0.025 wt. % 2,6-napthalene dicarboxylic acid ("NDA"). The liquid crystalline polymer and glass fibers are the same as employed in Example 1. To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 25 millimeters, and the L/D ratio is 30. The extruder has Temperature Zones 1-9, which may be set to the following temperatures: 330° C., 330° C., 310° C., 310° C., 310° C., 310° C., 320° C., 320° C., and 320° C., respectively. The screw design is selected so that melting begins at Zone 4. The polymer is supplied to the feed throat by means of a volumetric feeder. The glass fibers and talc are fed to Zones 4 and/or 6 as indicated in the table below. Once melt blended, the samples are extruded through a single-hole strand die, cooled through a water bath, and pelletized.

The samples are then tested for fiber length in the manner indicated above. The results are set forth in the table below in Table 3.

TABLE 3

|  | Sample 4 | Sample 5 | Sample 6 | Sample 7 | Sample 8 | Sample 9 |
| --- | --- | --- | --- | --- | --- | --- |
| Feeding sequence | Glass fibers at Zone #4; Talc at Zone #6 | Glass fibers at Zone #4; Talc at Zone #6 | Glass fibers at Zone #4; Talc at Zone #6 | Glass fibers at Zone #4; Talc at Zone #6 | Glass fibers at Zone #6; Talc at Zone #4 | Glass fibers at Zone #6; Talc at Zone #4 |
| L/D after GF feeding | 7.75 | 7.75 | 7.75 | 7.75 | 3.90 | 3.90 |
| L/D before GF feeding | 0 | 0 | 0 | 0 | 3.85 | 3.85 |
| Glass fiber length | | | | | | |
| Vol. Average ($\mu$m) | 90 | 100 | 100 | 110 | 370 | 350 |
| Vol. Standard Deviation | 0.05 | 0.06 | 0.05 | 0.06 | 0.17 | 0.18 |
| Max | 0.37 | 0.45 | 0.44 | 0.39 | 1.07 | 1.19 |
| Count | 3038 | 2584 | 1568 | 2295 | 1046 | 1266 |
| Coefficient of Variance (%) | 53 | 53 | 51 | 57 | 54 | 58 |

The length distribution of the fibers of Samples 4-9 is also shown in FIGS. 7-12, respectively. As indicated in Table 3 and FIGS. 7-12, when the glass fibers are fed at Zone #4 (Samples 4-7, L/D after glass fiber feeding=7.75), the fiber length becomes effectively shorter and its distribution is narrower. When fed at Zone #6 (Samples 8-9, L/D after glass fiber feeding=3.90), however, no significant change in length is observed.

Parts are injection molded from Samples 4-9 and tested for their thermal and mechanical properties. The results are set forth below in Table 4.

TABLE 4

|  | Sample 4 | Sample 5 | Sample 6 | Sample 7 | Sample 8 | Sample 9 |
| --- | --- | --- | --- | --- | --- | --- |
| Melt Viscosity at 1000 s$^{-1}$ and 350° C. (Pa-s) | 38.4 | 31.1 | 34.9 | 29.2 | 23.6 | 21.3 |
| Melt Viscosity at 400 s$^{-1}$ and 350° C. (Pa-s) | 54.2 | 42.6 | 48.6 | 39.7 | 36.6 | 32 |
| DTUL @ 1.8 Mpa (° C.) | 233 | 235 | 230 | 238 | 253 | 251 |
| Ten. Brk stress (MPa) | 92 | 94 | 89 | 94 | 108 | 100 |
| Ten. Modulus (MPa) | 11,725 | 12,093 | 11,060 | 11,404 | 16,270 | 14,736 |
| Ten. Brk strain (%) | 2.7 | 2.5 | 2.4 | 2.6 | 0.9 | 0.9 |
| Flex Brk stress (MPa) | 132 | 132 | 124 | 128 | 158 | 142 |
| Flex modulus (MPa) | 12,966 | 13,136 | 12,246 | 12,450 | 16,662 | 15,042 |
| Flex Brk strain (%) | 2.3 | 2.2 | 2.3 | 2.3 | 1.24 | 1.3 |
| Charpy Notched (KJ/m$^2$) | 3.7 | 4.3 | 3.2 | 3.8 | 6.3 | 5.0 |

EXAMPLE 3

Six (6) samples of a thermoplastic composition are formed from 49.375 wt. % of a liquid crystalline polymer, 0.3 wt. % Glycolube™ P, 0.2 wt. % alumina trihydrate, 0.1 wt. % 4,4'-biphenol, 0.025 wt. % 2,6-naphthalene dicarboxylic acid ("NDA"), and varying percentages of glass fibers and mineral filler (talc or mica). The liquid crystalline polymer of Samples 10-15 is the same as employed in Example 1. The liquid crystalline polymer of Samples 16-17 is formed from 4-hydroxybenzoic acid ("HBA"), NDA, terephthalic acid ("TA"), isophthalic acid ("IA"), hydroquinone ("HQ"), and acetaminophen ("APAP").

To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 25 millimeters, and the L/D ratio is 30. The extruder has Temperature Zones 1-9, which may be set to the following temperatures: 330° C., 330° C., 310° C., 310° C., 310° C., 310° C., 320° C., 320° C., and 320° C., respectively. The screw design is selected so that melting begins at Zone 4. The polymer is supplied to the feed throat by means of a volumetric feeder. The glass fibers and talc are fed to Zone 4. Once melt blended, the samples are extruded through a single-hole strand die, cooled through a water bath, and pelletized.

The samples are then tested for fiber length in the manner indicated above. The results are set forth in the table below in Table 5.

TABLE 5

| | Sample 10 | Sample 11 | Sample 12 | Sample 13 | Sample 14 | Sample 15 | Sample 16 | Sample 17 |
|---|---|---|---|---|---|---|---|---|
| Mineral Filler | Talc | Talc | Talc | Talc | Talc | Mica | Mica | Talc |
| Wt. % of Mineral Filler | 22.0 | 10 | 16.0 | 27 | 13 | 22 | 22.0 | 22.0 |
| Wt. % of Glass Fibers | 10.0 | 20 | 16.0 | 13 | 27 | 10 | 10.0 | 10.0 |
| Glass fiber length | | | | | | | | |
| Vol. Average (μm) | 0.12 | 0.11 | 0.12 | 0.10 | 0.10 | 0.10 | 0.10 | 0.09 |
| Vol. Standard Deviation | 0.08 | 0.07 | 0.08 | 0.05 | 0.07 | 0.06 | 0.06 | 0.05 |
| Max | 0.5 | 0.46 | 0.51 | 0.35 | 0.47 | 0.36 | 0.32 | 0.28 |
| Count | 1198 | 1893 | 1845 | 914 | 1390 | 1235 | 787 | 847 |
| Coefficient of Variance (%) | 66 | 67 | 68 | 56 | 66 | 61 | 59 | 58 |

The length distribution of the fibers of Samples 10-17 is also shown in FIGS. 13-20, respectively. As indicated, no significant change in fiber length and distribution is observed by changing filler ratio and filler content.

Parts are injection molded from Samples 10-17 and tested for their thermal and mechanical properties. The results are set forth below.

| | Sample 10 | Sample 11 | Sample 12 | Sample 13 | Sample 14 | Sample 15 | Sample 16 | Sample 17 |
|---|---|---|---|---|---|---|---|---|
| Melt Viscosity at 1000 s$^{-1}$ and 350° C. (Pa-s) | 17 | 18 | 19 | 19 | 27 | 24 | 23 | 17 |
| Melt Viscosity at 400 s$^{-1}$ and 350° C. (Pa-s) | 24 | 22 | 25 | 25 | 37 | 32 | 31 | 22 |
| DTUL @ 1.8 Mpa (° C.) | 232 | 235 | 234 | 241 | 238 | 243 | 258 | 238 |
| Ten. Brk stress (MPa) | 116 | 125 | 116 | 108 | 114 | 121 | 143 | 131 |
| Ten. Modulus (MPa) | 10,423 | 11,836 | 11,417 | 11,295 | 12,728 | 13,646 | 15,903 | 12,269 |
| Ten. Brk strain (%) | 2.74 | 2.67 | 2.85 | 2.49 | 2.48 | 2.09 | 1.87 | 2.18 |
| Flex Brk stress (MPa) | 138 | 153 | 145 | 137 | 155 | 162 | 184 | 159 |
| Flex modulus (MPa) | 11,019 | 12,065 | 12,047 | 11,835 | 13,364 | 14,773 | 16,372 | 12,196 |
| Flex Brk strain (%) | 2.93 | 2.9 | 2.7 | 2.6 | 2.51 | 2.41 | 2.25 | 2.91 |
| Charpy Notched (KJ/m$^2$) | 15.4 | 24.4 | 14.3 | 5.1 | 12.6 | 5.0 | 4.6 | 12.8 |

EXAMPLE 4

Two (2) samples of a thermoplastic composition are formed from 64.375 wt. % of a liquid crystalline polymer, 18 wt. % glass fibers, 18 wt. % talc, 0.3 wt. % Glycolube™ P, 0.2 wt. % alumina trihydrate, 0.1 wt. % 4,4'-biphenol, and 0.025 wt. % 2,6-napthalene dicarboxylic acid ("NDA"). The liquid crystalline polymer and the glass fibers are the same as employed in Example 1. To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 32 millimeters, and the L/D ratio is 30, The extruder has Temperature Zones 1-9, which may be set to the following temperatures: 330° C., 330° C., 310° C., 310° C., 310° C., 310° C., 320° C., 320° C., and 320° C., respectively. The screw design is selected so that melting occurs after Zone 4. The polymer is supplied to the feed throat by means of a volumetric feeder. The glass fibers and talc are fed to Zones 4 and 6, respectively. Once melt blended, the sample is extruded through a single-hole strand die, cooled through a water bath, and pelletized.

The sample is then tested for fiber length in the manner indicated above. The results are set forth in Table 6 below.

TABLE 6

| | Sample 18 |
|---|---|
| L/D after GF feeding | 7.75 |
| L/D before GF feeding | 0 |
| Vol. Average Length of Fibers (μm) | 120 |
| Vol. Standard Deviation of Fibers | 0.08 |
| Max | 0.51 |
| Count | 1845 |
| Coefficient of Variance (%) | 68 |

A part is injection molded from Sample 18 and tested for its thermal and mechanical properties. The results are set forth below in Table 7.

TABLE 7

| | Sample 18 |
|---|---|
| Melt Viscosity at 1000 s$^{-1}$ and 350° C. (Pa-s) | 16.5 |
| DTUL @ 1.8 Mpa (° C.) | 230 |
| Ten. Brk stress (MPa) | 102 |
| Ten. Modulus (MPa) | 10,620 |
| Ten. Brk strain (%) | 2.60 |
| Flex Brk stress (MPa) | 132 |
| Flex modulus (MPa) | 11,401 |
| Flex Brk strain (%) | 2.5 |
| Charpy Notched (KJ/m$^2$) | 4.0 |
| Weld Line Strength (kPa) | 58 |

EXAMPLE 5

A sample of a thermoplastic composition (Sample 19) is formed from 64.375 wt. % of a liquid crystalline polymer, 18 wt. % glass fibers, 18 wt. % talc, 0.3 wt. % Glycolube™ P, 0.2 wt. % alumina trihydrate, 0.1 wt. % 4,4' biphenol, and 0.025 wt. % 2,6-napthalene dicarboxylic acid ("NDA"). The liquid crystalline polymer and the glass fibers are the same as employed in Example 1. To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 32 millimeters, and the L/D ratio is 30. The extruder has Temperature Zones 1-9, which may be set to the following temperatures: 330° C., 330° C., 310° C., 310° C., 310° C., 310° C., 320° C., 320° C., and 320° C., respectively. The screw design is selected so that melting occurs after Zone 4. The polymer is supplied to the feed throat by means of a volumetric feeder. The glass fibers and talc are fed to Zones 4 and 6, respectively. Once melt blended, the sample is extruded through a single-hole strand die, cooled through a water bath, and pelletized.

The sample is then tested for fiber length in the manner indicated above. The results are set forth in Table 8 below.

TABLE 8

| | Sample 19 |
|---|---|
| L/D after GF feeding | 8.75 |
| L/D before GF feeding | 1.75 |
| Vol. Average Length of Fibers (μm) | 110 |
| Vol. Standard Deviation of Fibers | 60 |
| Max | 480 |
| Count | 1477 |
| Coefficient of Variance (%) | 51 |

A part is injection molded from the sample and tested for its thermal and mechanical properties. The results are set forth below in Table 9.

TABLE 9

| | Sample 19 |
|---|---|
| Melt Viscosity at 1000 s$^{-1}$ and 350° C. (Pa-s) | 15 |
| Ten. Brk stress (MPa) | 112 |
| Ten. Modulus (MPa) | 11583 |
| Ten. Brk strain (%) | 2 |
| Flex Brk stress (MPa) | 144 |
| Flex modulus (MPa) | 11963 |
| Flex Brk strain (%) | 2 |
| Charpy Notched (KJ/m$^2$) | 8 |
| Weld Line Strength (kPa) | 58 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrical connector that comprises at least two opposing walls between which a passageway is defined for receiving a contact pin, wherein the walls have a width of about 500 micrometers or less, the walls being formed from a thermoplastic composition that comprises from about 20 wt. % to about 90 wt. % of at least one melt-processed thermotropic liquid crystalline polymer and from about 2 wt. % to about 40 wt. % of fibers, wherein the ratio of the width of at least one of the walls to the volume average length of the fibers is from about 0.8 to about 3.2, and wherein the fibers have a volume average length of from about 80 to about 250 micrometers and wherein at least about 70% by volume of the fibers have a length of from about 80 to about 250 micrometers, wherein the at least one melt-processed thermotropic liquid crystalline polymer is formed by melt processing a first thermotropic liquid crystalline polymer in the presence of a flow modifier comprising a functional compound that includes an aromatic diol, hydrate, aromatic dicarboxylic acid, or a combination thereof.

2. The electrical connector of claim 1, wherein the walls have a width of from about 200 to about 400 micrometers.

3. The electrical connector of claim 1, wherein the ratio of the width of at least one of the walls to the volume average length of the fibers is from about 1.2 to about 2.9.

4. The electrical connector of claim 1, wherein the fibers have a volume average length of from about 110 to about 180 micrometers.

5. The electrical connector of claim 4, wherein at least about 70% by volume of the fibers have a length of from about 110 to about 180 micrometers.

6. The electrical connector of claim 1, wherein at least about 90% by volume of the fibers have a length of from about 80 to about 250 micrometers.

7. The electrical connector of claim 1, wherein the fibers are glass fibers.

8. The electrical connector of claim 1, wherein the thermotropic crystalline polymer contains repeating units derived from 4-hydroxybenzoic acid, 2,6-hydroxynaphtoic acid, or both.

9. The electrical connector of claim 8, wherein the polymer further contains repeating units derived from terephthalic acid, isophthalic acid, hydroquinone, 4,4-biphenol, or a combination thereof.

10. The electrical connector of claim 1, wherein the thermoplastic composition further comprises at least one mineral filler.

11. The electrical connector of claim 1, wherein the thermoplastic composition has a melt viscosity of from about 0.5 to about 100 Pa-s, as determined at a shear rate of 1000 seconds$^{-1}$ and temperature of 350° C. in accordance with ASTM Test No. 1238-70.

12. A thermoplastic composition comprising from about 20 wt. % to about 90 wt. % of at least one melt-processed thermotropic liquid crystalline polymer, from about 2 wt. % to about 40 wt. % of glass fibers, and from about 1 wt. % to about 40 wt. % of at least one mineral filler, wherein the glass fibers have a volume average length of from about 100 to about 200 micrometers and wherein at least about 70% by volume of the fibers have a length of from about 100 to about 200 micrometers,
wherein the at least one melt-processed thermotropic liquid crystalline polymer is formed by melt processing a first thermotropic liquid crystalline polymer in the presence of a flow modifier comprising a functional compound that includes an aromatic diol, hydrate, aromatic dicarboxylic acid, or a combination thereof.

13. The composition of claim 12, wherein the fibers have a volume average length of from about 110 to about 180 micrometers.

14. The composition of claim 13, wherein at least about 70% by volume of the fibers have a length of from about 110 to about 180 micrometers.

15. The composition of claim 12 wherein at least about 90% by volume of the fibers have a length of from about 100 to about 200 micrometers.

16. The composition of claim 12, wherein the thermotropic crystalline polymer contains repeating units derived from 4-hydroxybenzoic acid, 2,6-hydroxynaphtoic acid, or both.

17. The composition of claim 16, wherein the polymer further contains repeating units derived from terephthalic acid, isophthalic acid, hydroquinone, 4,4-biphenol, or a combination thereof.

18. The composition of claim 12, wherein the thermoplastic composition has a melt viscosity of from about 0.5 to about 100 Pa-s, as determined at a shear rate of 1000 seconds$^{-1}$ and temperature of 350° C. in accordance with ASTM Test No. 1238-70.

19. A molded housing that comprises the thermoplastic composition of claim 12.

20. The molded housing of claim 19, wherein the housing defines opposing walls between which a passageway is defined, the walls having a width of about 500 micrometers or less.

21. The thermoplastic composition of claim 12, wherein the composition includes an aromatic diol.

22. The thermoplastic composition of claim 12, wherein the composition includes an aromatic dicarboxylic acid.

23. The thermoplastic composition of claim 12, wherein the composition includes a hydrate.

24. The thermoplastic composition of claim 12, wherein the composition includes 4,4'-biphenol, 2,6-napthalenedicarboxylic acid, and alumina trihydrate.

25. The electrical connector of claim 1, wherein the thermotropic crystalline polymer is obtained from an aromatic hydroxycarboxylic acid, aromatic dicarboxylic acid, aromatic diol, aromatic aminocarboxylic acid, aromatic amine optionally having a phenolic hydroxy group, aromatic diamine optionally having phenolic hydroxy group, or combinations thereof.

26. The thermoplastic composition of claim 12, wherein the thermotropic crystalline polymer is obtained from an aromatic hydroxycarboxylic acid, aromatic dicarboxylic acid, aromatic diol, aromatic aminocarboxylic acid, aromatic amine optionally having a phenolic hydroxy group, aromatic diamine optionally having phenolic hydroxy group, or combinations thereof.

* * * * *